(12) United States Patent  
Shinohara et al.

(10) Patent No.: US 7,896,030 B2  
(45) Date of Patent: Mar. 1, 2011

(54) SENSOR-EQUIPPED JOINT MEMBER

(75) Inventors: Tsutomu Shinohara, Osaka (JP); Michio Yamaji, Osaka (JP); Shigeaki Tanaka, Osaka (JP); Mutsunori Koyomogi, Osaka (JP); Ichiro Mine, Osaka (JP); Ichiro Tokuda, Osaka (JP); Kenji Tsubota, Osaka (JP)

(73) Assignee: Fujikin Incorporated, Osaka-shi (JP)

( * ) Notice: Subject to any disclaimer, the term of this patent is extended or adjusted under 35 U.S.C. 154(b) by 770 days.

(21) Appl. No.: 11/662,502

(22) PCT Filed: Aug. 26, 2005

(86) PCT No.: PCT/JP2005/015512

§ 371 (c)(1),  
(2), (4) Date: Mar. 12, 2007

(87) PCT Pub. No.: WO2006/030615

PCT Pub. Date: Mar. 23, 2006

(65) Prior Publication Data

US 2007/0295414 A1    Dec. 27, 2007

(30) Foreign Application Priority Data

Sep. 16, 2004    (JP) .............................. 2004-270016

(51) Int. Cl.  
*F16K 11/10* (2006.01)
(52) U.S. Cl. ..................................... 137/884
(58) Field of Classification Search ................ 137/269, 137/270, 271, 597, 884  
See application file for complete search history.

(56) References Cited

U.S. PATENT DOCUMENTS

| 5,819,782 | A  | * | 10/1998 | Itafuji .......................... 137/240 |
| 6,445,969 | B1 | * | 9/2002 | Kenney et al. ............... 700/108 |
| 6,617,963 | B1 | * | 9/2003 | Watters et al. ........... 340/10.41 |
| 6,769,463 | B2 | * | 8/2004 | Vu ................................. 141/98 |
| 6,806,808 | B1 | * | 10/2004 | Watters et al. ........... 340/10.41 |
| 7,017,609 | B2 | * | 3/2006 | Miwa .......................... 137/884 |
| 7,034,683 | B2 | * | 4/2006 | Ghazarian ................ 340/568.1 |
| 7,079,023 | B2 | * | 7/2006 | Haller ......................... 340/522 |
| 7,102,523 | B2 | * | 9/2006 | Shanks et al. ............. 340/572.7 |
| 2002/0195165 | A1 | * | 12/2002 | Vu ................................. 141/98 |
| 2003/0106597 | A1 | * | 6/2003 | Ichikawa et al. ............. 137/884 |

FOREIGN PATENT DOCUMENTS

| EP | 1 167 846 A2 | 1/2002 |
| JP | 11-118054 | 4/1999 |
| JP | 2001-254900 | 9/2001 |
| JP | 2003-139271 | 5/2003 |
| JP | 2003-240180 | 8/2003 |

* cited by examiner

*Primary Examiner*—John Fox  
(74) *Attorney, Agent, or Firm*—Kratz, Quintos & Hanson, LLP

(57) ABSTRACT

The present invention provides a joint member which suppresses the increase of the number of members and enables the provision of a further compactified integrated fluid control apparatus.

A sensor-equipped joint member 10 includes a channel block 41 including a V-shaped channel 41a formed therein for communicating adjacent fluid control devices 16 and 20 to each other at their lower-end openings, and a pressure sensor 42 provided on a side surface of the channel block 41. The channel block 41 is provided with a branched channel 41b which is branched from the V-shaped channel 41a and is communicated to the pressure sensor 42.

11 Claims, 3 Drawing Sheets

SENSOR-EQUIPPED JOINT MEMBER

TECHNICAL FIELD

The present invention relates to a joint member suitably used in an integrated fluid control apparatus which is used in a semiconductor fabricating apparatus or the like and is assembled in such a manner as to enable upwardly pulling out individual fluid control devices during maintenance.

BACKGROUND ART

A fluid control apparatus for use in a semiconductor fabricating apparatus is constituted by fluid control devices such as mass-flow controllers and shut-off valves arranged in a plurality of rows and device communication means which communicate the flow channels of the fluid control devices in adjacent rows to each other at predetermined positions. In recent years, fluid control apparatuses of this type is configured to include a plurality of fluid control devices placed in an upper stage and block-shaped joint members placed in a lower stage for communicating the plurality of fluid control devices to one another to increase the degree of integration (Patent Document 1 and Patent Document 2).

FIG. 4 illustrates an integrated fluid control apparatus disclosed in Patent Document 1. A single line (C) in the fluid control apparatus is constituted by a plurality of upper-stage members and a plurality of lower-stage members. The upper-stage members include a check valve (11), a pressure regulator (16), a pressure sensor (12), a counter-V-shaped channel block (20), a shutoff opening device (13), a mass-flow controller (14), a shut-off valve (15), a counter-V-shaped channel block (20) and a filter (17). The lower-stage members include an L-shaped channel block joint (32) which is communicated to the check valve (11) and is equipped with an inlet joint (31), a V-shaped channel block joint (33) which communicates the check value (11) to the pressure regulator (16), a V-shaped channel block joint (33) which communicates the pressure regulator (16) to the pressure sensor (12), a V-shaped channel block joint (33) which communicates the pressure sensor (12) to the counter-V-shaped channel block (20), a V-shaped channel block joint (33) which communicates the counter-V-shaped channel block (20) to the shutoff opening device (13), a V-shaped channel block joint (33) which communicates the shutoff opening device (13) to the mass-flow controller (14), a V-shaped channel block joint (33) which communicates the mass-flow controller (14) to the shut-off valve (15), a V-shaped channel block joint (33) which communicates the shut-off valve (15) to the counter-V-shaped channel block (20), a V-shaped channel block joint (33) which communicates the counter-V-shaped channel block (20) to the filter (17), and an L-shaped channel block joint (32) which is communicated to the filter (17) and is equipped with an outlet joint (34), which are placed in the mentioned order from the left to the right. Further, the various types of joint members (31), (32), (33) and (34), which are the lower-stage members, are mounted on a secondary substrate (3) with a smaller width and a greater length, and the various types of fluid control devices (11), (16), (12), (20), (13), (14), (15), (20) and (17), which are the upper-stage members, are mounted thereon to straddle these lower-stage members (31), (32), (33) and (34) to constitute the single line (C). A plurality of lines having configurations similar to that of the line (C) are arranged in parallel on a main substrate (2), and the respective lines (C) are communicated to one another at their shutoff opening devices (13) through channel communication means (50) constituted by three I-shaped channel block joints (51) and a tube (52) which communicates the I-shaped channel block joints (51) to one another to constitute an integrated fluid control apparatus.

Patent Document 2 suggests mounting a pressure regulator (16) and a pressure sensor (12) which are separated from each other on a single block-shaped main body to form a novel fluid control apparatus, although not illustrated.

Patent Document 1:
  Japanese Patent Application Laid-Open No. 2001-254900
Patent Document 2:
  Japanese Patent Application Laid-Open No. H11-118054

DISCLOSURE OF THE INVENTION

Problems to be Solved by the Invention

It is desired integrated fluid control apparatuses of this type are further compactified. The fluid control apparatus disclosed in Patent Document 2 is superior to the fluid control apparatus of Patent Document 1 in terms of compactification, but it requires an additional block-shaped main body, thereby having the problem of an increase of the number of members.

It is an object of the present invention to provide a joint member capable of suppressing the increase of the number of members and realizing an integrated fluid control apparatus that is further compactified.

MEANS FOR SOLVING THE PROBLEMS

A sensor-equipped joint member according to the present invention includes a channel block including a channel formed therein for communicating adjacent fluid control devices to each other at their lower-end openings; and a sensor provided for the channel block.

The fluid control devices may include, for example, a pressure regulator, a shut-off valve, a channel block, a filter and the like, wherein, for example, the pressure regulator are communicated to the shut-off valve or the channel block through the sensor-equipped joint member.

The channel block has a rectangular parallelepiped shape or substantially a rectangular parallelepiped shape, and the channel has an upper-end opening to be communicated to the lower-end opening of a fluid control device.

Various types of sensors such as a pressure sensor, a temperature sensor, a flow rate sensor may be employed as the sensor.

The sensor is preferably provided on a side surface of the channel block. A fluid control device is provided on the upper surface of the channel block, and the lower surface of the channel block is mounted and secured to the upper surface of a substrate. In the direction of the fluid flow within the channel block, the sensor may be provided either on the side surface of the channel block at the upstream side or on the side surface of the channel block at the downstream side. Also, the sensor may be provided on a side surface which is parallel to the direction of the flow. The sensor-equipped joint member constitute a single line with a single direction of fluid flow, in cooperation with other joint members, and this line and other similar lines are arranged in parallel to constitute a single fluid control apparatus. In this case, it is preferable that the sensor is provided on the side surface of the channel block at the upstream side and/or the side surface of the channel block at the downstream side, in view of reducing of the space of the fluid control apparatus as much as possible.

The sensor may be provided on a side surface that is perpendicular to a direction of fluid flow.

The sensor may be provided with an RFID tag capable of reading and writing of information in a non-contact manner. In this case, the RFID tag has information written thereto about the single sensor-equipped joint member, and allows information about assembly to be additionally written thereto during the assembly.

An RFID (Radio Frequency Identification) tag is constituted by a memory (IC chip) for storing data and an antenna for picking up radio waves, which are integrated therein. In order to place an RFID tag on the sensor, the RFID tag can be bonded to the sensor or the channel block. Also, the sensor can be configured to incorporate a sensor portion for acquiring pressure data, temperature data and the like, an IC chip for storing information from the sensor portion or the outside, and an antenna for communication, integrally within a single block, to provide the functions of an RFID tag to the sensor.

By mounting an RFID tag on the sensor-equipped joint member, it is possible to write, therein, information about the single sensor-equipped joint member (a product number, a code number, the date of fabrication thereof, a fabrication lot number, results of inspections, and the like) at the shipment of the single sensor-equipped joint member. This enables easily acquiring the information by reading it at the ship-to site. Further, in the case of performing assembly and the like, information about the assembly (the name of used fluid, the name of the line, the record of assembly, the record of inspections and the like) maybe additionally written therein, which enables acquiring, after the completion of the assembly, all the information about the shipment to assembly of the product (traceability).

Also, as the contents of the RFID tag, it is possible to store, therein, all related information, in addition to the aforementioned contents. Further, the RFID tag may be installed at any position which is not influenced by the assembly and the like.

Further, by providing (integrating) a writing function to the RFID tag, it is possible to write, in the RFID tag, information generated from the sensor (the results of measurements of the pressure, the temperature or the like), at regular intervals, in addition to information written from the outside. This enables checking the information from the sensor along with the aforementioned information written from the outside, by reading them from the outside.

Further, instead of providing a sensor and an RFID tag separately, a sensor circuit integrally incorporating such a sensor and an RFID can be mounted on the joint member to enable writing and storing outputs from the sensor into the RFID tag and reading and outputting them to the outside as required.

The sensor may be a pressure sensor, and the channel block may be provided with a communication channel for communicating adjacent fluid control devices to each other at their lower-end openings, the communication channel being one of V-shaped and U-shaped; and a branched channel which is branched from the communication channel and is communicated to the pressure sensor. Such a pressure sensor has been treated as one of fluid control devices placed in an upper stage in a conventional fluid control apparatus. By mounting the pressure sensor on a joint member placed in a lower stage, it is possible to eliminate the necessity of providing the space for installing the pressure sensor, thereby reducing the space for installing the fluid control apparatus equipped with the pressure sensor.

A fluid control apparatus according to the present invention includes a plurality of fluid control devices; and a plurality of block-shaped joint members each provided with a channel for communicating adjacent fluid control devices to each other at their lower-end openings, wherein at least one of the block-shaped joint members is the aforementioned sensor-equipped joint member.

EFFECT OF THE INVENTION

The sensor-equipped joint member according to the present invention can be substituted for a well-known joint member to compactify a fluid control apparatus including a plurality of fluid control devices, a plurality of joint members, and a sensor as a fluid control device.

DESCRIPTION OF REFERENCE NUMERALS

Figure 1:
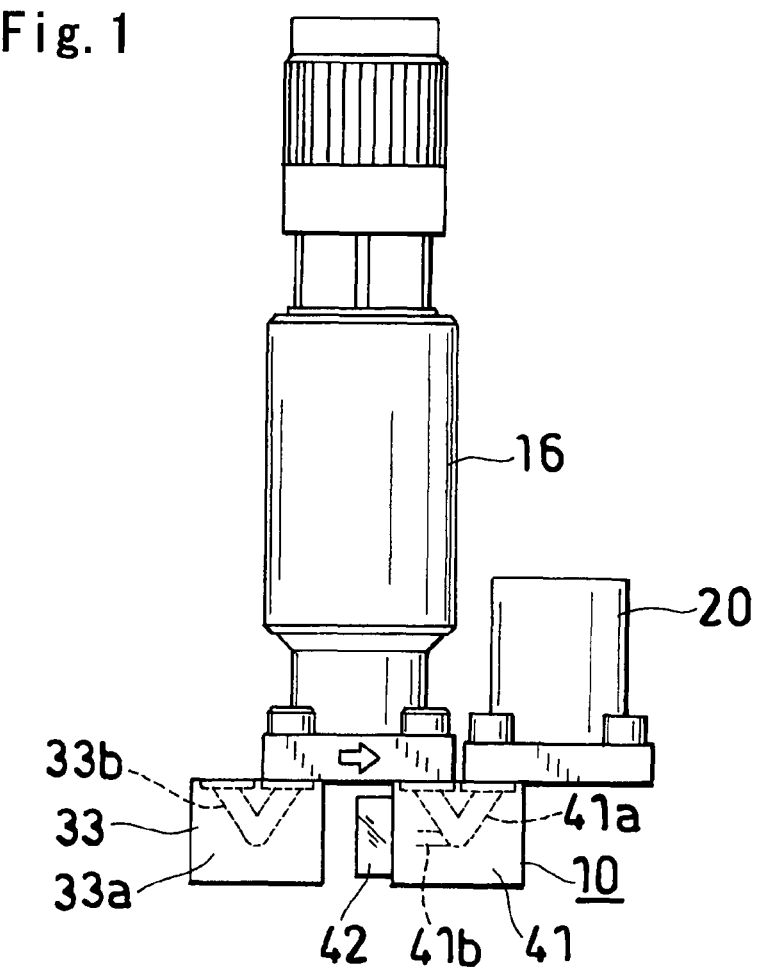
FIG. 1 is a side view illustrating a first embodiment of a sensor-equipped joint member according to the present invention.

(10) sensor-equipped joint member
(16), (20) fluid control apparatus
(41) channel block
(41a) communication channel
(41b) branched channel
(42) pressure sensor (sensor)

BEST MODE FOR CARRYING OUT THE INVENTION

Hereinafter, an embodiment of the present invention will be described, with reference to the drawings.

In the following description, the terms "upper", "lower", "left" and "right" will indicate the upper, lower, left and right portions in the drawings. However, these terms "upper", "lower", "left" and "right" will be merely used for convenience and, for example, the upper and lower portions in the drawings may be the right and left portions in actual use.

Figure 2:
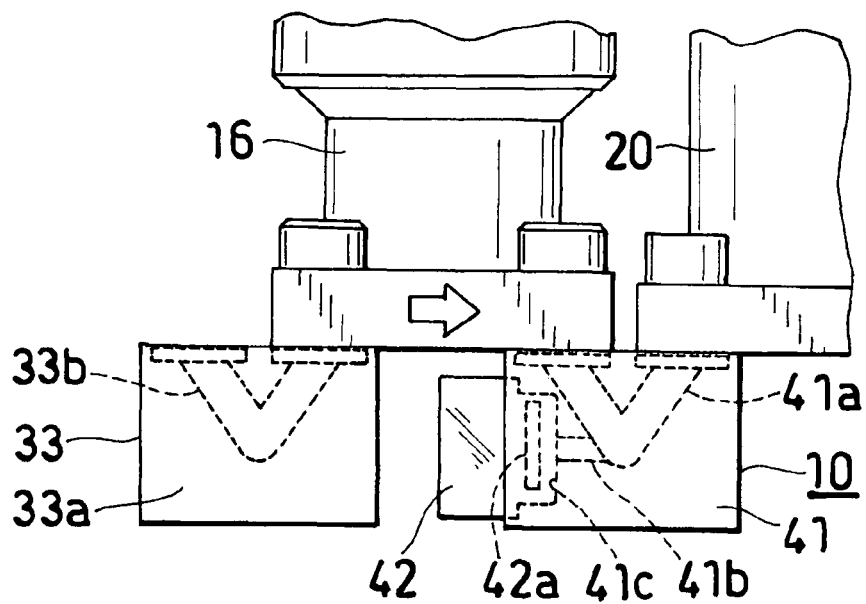
FIG. 2 is a partially enlarged view of FIG. 1.
Figure 3:
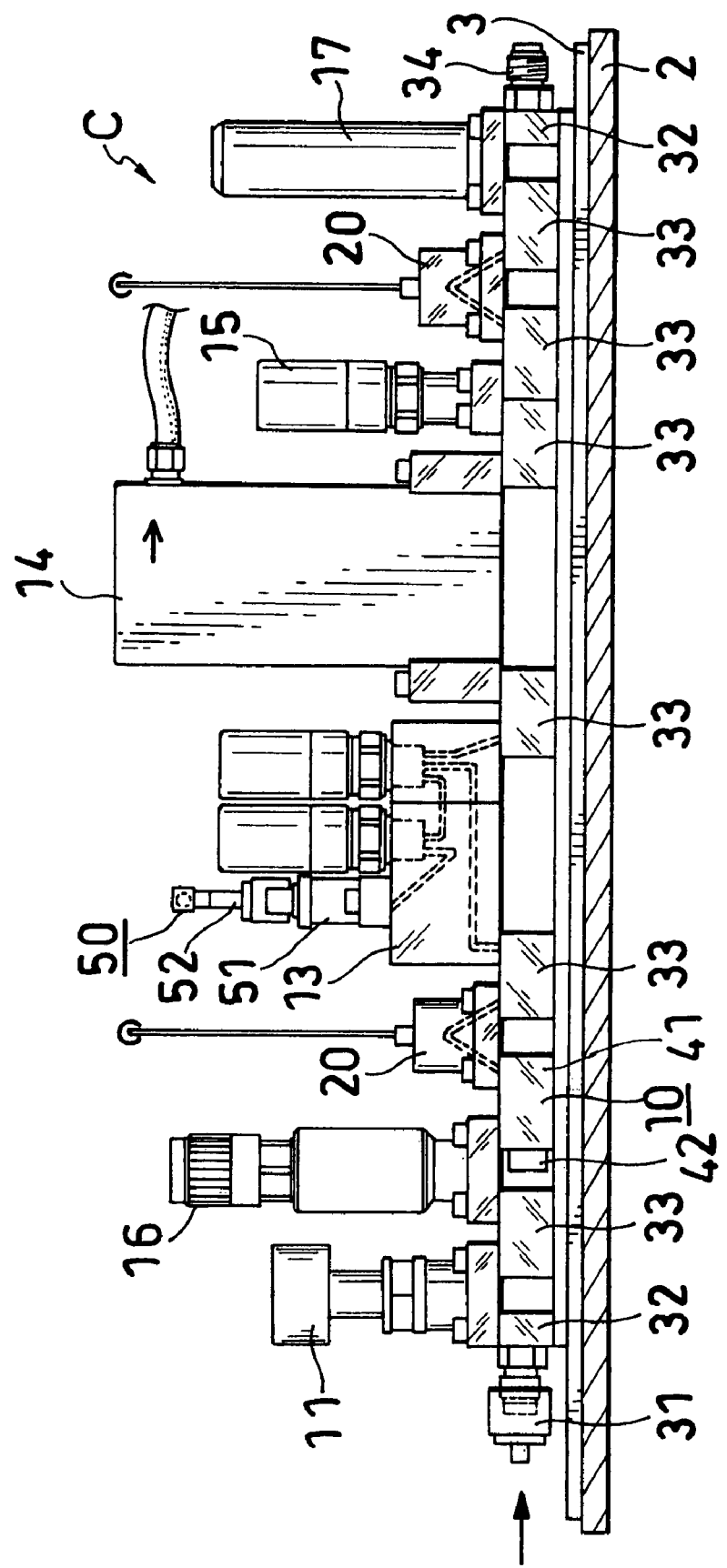
FIG. 3 is a side view illustrating a fluid control apparatus employing the sensor-equipped joint member according to the present invention.

FIG. 1 and FIG. 2 illustrate a sensor-equipped joint member (10) according to the present invention at a state where it is mounted to a fluid control device (16). FIG. 3 illustrates a single line (C) in a fluid control apparatus which employs the sensor-equipped joint member (10) according to the present invention.

In FIGS. 1 and 2, under the pressure regulator (16) as a fluid control device, there are provided a block joint (33) used for communication with an adjacent fluid control device (not illustrated) at the left side thereof, and the joint member (10) used for communication with an adjacent fluid control device (20) at the right side thereof.

The block joint (33) is of a well known type and is constituted by a rectangular-parallelepiped block-shaped main body (33a) and a V-shaped channel (33b) formed therethrough.

The joint member (10) at the right side is a sensor-equipped joint member according to the present invention and includes a channel block (41) provided with a communication channel (41a) for communicating the left and right adjacent fluid control devices (16) and (20) to each other at their lower-end openings and a sensor (42) provided on the left side surface of the channel block (41).

The sensor (42) is a pressure sensor including a diaphragm (42a), and there are formed, in the channel block (41), a V-shaped communication channel (41a) for communicating the left and right adjacent fluid control devices (16) and (20) to each other at their lower-end openings, and a branched channel (41b) which is branched from the lower end portion of the communication channel (41a), extended leftwardly and is communicated to the pressure sensor (42). The channel block (41) is formed by processing a block joint (33) to add, thereto, the branched channel (41b) and a pressure-sensor mounting recessed portion (41c). This can suppress the increase of the number of members.

The flow channel within the pressure regulator (16) is directed in the direction from left to right as indicated by an arrow, and the pressure sensor (42) of the sensor-equipped joint member (10) at the right side monitors the pressure at the outlet side of the pressure regulator (16).

In FIG. 3, a single line (C) in the fluid control apparatus is constituted by a plurality of upper-stage members and a plurality of lower-stage members. The upper-stage members include a check valve (11), a pressure regulator (16), a counter-V-shaped channel block (20), a shutoff opening device (13), a mass-flow controller (14), a shut-off valve (15), a counter-V-shaped channel block (20) and a filter (17). The lower-stage members include an L-shaped channel block joint (32) which is communicated to the check valve (11) and is equipped with an inlet joint (31), a V-shaped channel block (33) which communicates the check value (11) to the pressure regulator (16), a sensor-equipped joint member (10) which communicates the pressure regulator (16) to the counter-V-shaped channel block (20), a V-shaped channel block joint (33) which communicates the counter-V-shaped channel block (20) to the shutoff opening device (13), a V-shaped channel block joint (33) which communicates the shutoff opening device (13) to the mass-flow controller (14), a V-shaped channel block joint (33) which communicates the mass-flow controller (14) to the shut-off valve (15), a V-shaped channel block joint (33) which communicates the shut-off valve (15) to the counter-V-shaped channel block (20), a V-shaped channel block joint (33) which communicates the counter-V-shaped channel block (20) to the filter (17), and an L-shaped channel block joint (32) which is communicated to the filter (17) and is equipped with an outlet joint (34), which are placed in the mentioned order from the left to the right. Further, the various types of joint members (31), (32), (33), (10) and (34), which are the lower-stage members, are mounted on a secondary substrate (3) with a smaller width and a greater length, and the various types of fluid control devices (11), (16), (20), (13), (14), (15), (20) and (17), which are the upper-stage members, are mounted to straddle these lower-stage members (31), (32), (33), (10), and (34) to form the single line (C). A plurality of lines having a configuration similar to that of the line (C) are arranged in parallel on a main substrate (2), and the respective lines (C) are communicated to one another at their shutoff opening devices (13), through channel communication means (50) constituted by three I-shaped channel block joints (51) and a tube (52) which communicates these I-shaped channel block joints (51) to one another to form the integrated fluid control apparatus.

Figure 4:
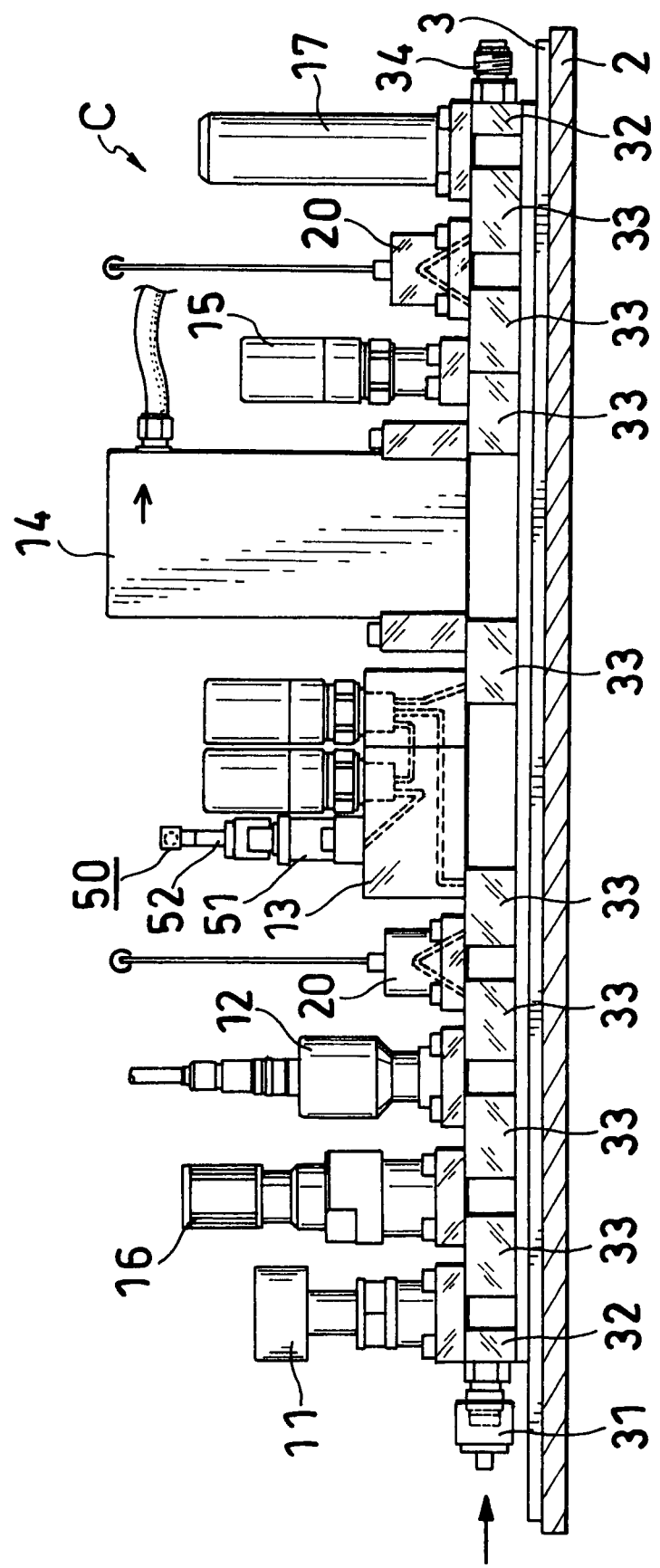
FIG. 4 is a side view illustrating a conventional fluid control apparatus.

As can be easily understood from the comparison between FIGS. 3 and 4, the space for the pressure sensor (12) illustrated in FIG. 4 is completely eliminated in FIG. 3, thereby providing an extremely compact fluid control apparatus with a smaller horizontal length in FIG. 3. Further, the channel block (41) in the sensor-equipped joint member (10), which is a novel member, can be fabricated by additionally processing a block joint (33). This can suppress the increases of the number of members and the burden of processing, as much as possible.

Further, while the sensor-equipped joint member (10) is placed only at the right side of the pressure regulator (16) in the aforementioned description, such a sensor-equipped joint member (10) may be substituted for the joint member (33) at the left side of the pressure regulator (16) to monitor the pressure at the inlet side of the pressure regulator (16), as well as the pressure at the outlet side thereof. Also, such a sensor-equipped joint member (10) maybe substituted for a joint member at a different portion from the pressure regulator (16) such as, for example, the V-shaped channel block joint (33) which communicates the counter-V-shaped channel block (20) to the shutoff opening device (13). Further, the sensor (42) is not limited to a pressure sensor. Further, the communication channel (41a) in the sensor-equipped joint member (10) may have an U-shape, instead of a V-shape. Further, although not illustrated, the sensor (42) may be configured to be provided with an RFID tag which enables reading and writing information therefrom and therein in a non-contact manner, and information about the single sensor-equipped joint member may be written in the RFID tag, and information about assembly may be additionally written into the RFID tag during assembly.

INDUSTRIAL APPLICABILITY

The sensor-equipped joint member according to the present invention can be substituted for a well-known joint member to suppress the increase of the number of members in a fluid control apparatus including a plurality of fluid control devices and a plurality of joint members and to compactify a fluid control device including a sensor. Accordingly, the sensor-equipped joint member can be easily applied to an apparatus including fluid control devices integrated therein.

What is claimed is:

1. A fluid control apparatus comprising:
a plurality of fluid control devices; and
a plurality of fluid joint members, being separate components from the plurality of fluid control devices, provided with a channel for communicating adjacent fluid control devices to each other at their lower-end openings, wherein
at least one of the fluid joint members is a block-shaped joint member provided with a pressure sensor, said pressure sensor being a separate component from the at least one of the fluid joint members, and a communication channel for communicating adjacent fluid control devices to each other at their lower-end openings; the communication channel being one of U-shaped and V-shaped, a branched channel which is branched from the communication channel and is communicated to the pressure sensor and a pressure sensor mounting recessed portion.

2. The fluid control apparatus according to claim 1, wherein the pressure sensor is provided on a side surface of the fluid joint member.

3. The fluid control apparatus according to claim 1, wherein the pressure sensor is provided on a side surface that is perpendicular to a direction of fluid flow.

4. The fluid control apparatus according to claim 1, wherein the pressure sensor is provided with an RFID tag capable of reading and writing of information in a non-contact manner.

5. The fluid control apparatus according to claim 4, wherein the RFID tag has information written thereto about the single sensor-equipped joint member, and allows information about assembly to be additionally written thereto during the assembly.

6. The fluid control apparatus according to claim 1, wherein the communication channel and the pressure sensor mounting recessed portion is formed by processing the block-shaped joint member.

7. The fluid control apparatus according to claim 1, wherein the adjacent fluid joint members are provided flush with each other.

8. The fluid control apparatus according to claim 7, wherein the sensor is provided on a side surface of the channel block.

9. The fluid control apparatus according to claim 7, wherein the sensor is provided on a side surface that is perpendicular to a direction of fluid flow.

10. The fluid control apparatus according to claim 7, wherein the sensor is provided with an RFID tag capable of reading and writing of information in a non-contact manner.

11. The fluid control apparatus according to claim 10, wherein the RFID tag has information written thereto about the single sensor-equipped joint member, and allows information about assembly to be additionally written thereto during the assembly.

* * * * *